March 19, 1963  B. G. LIFT  3,081,846
DASHPOT ASSEMBLY
Filed Nov. 7, 1960  2 Sheets-Sheet 1

INVENTOR.
BOB G. LIFT
BY Whittemore
Hulbert & Belknap
ATTORNEYS

March 19, 1963
B. G. LIFT
3,081,846
DASHPOT ASSEMBLY
Filed Nov. 7, 1960
2 Sheets-Sheet 2
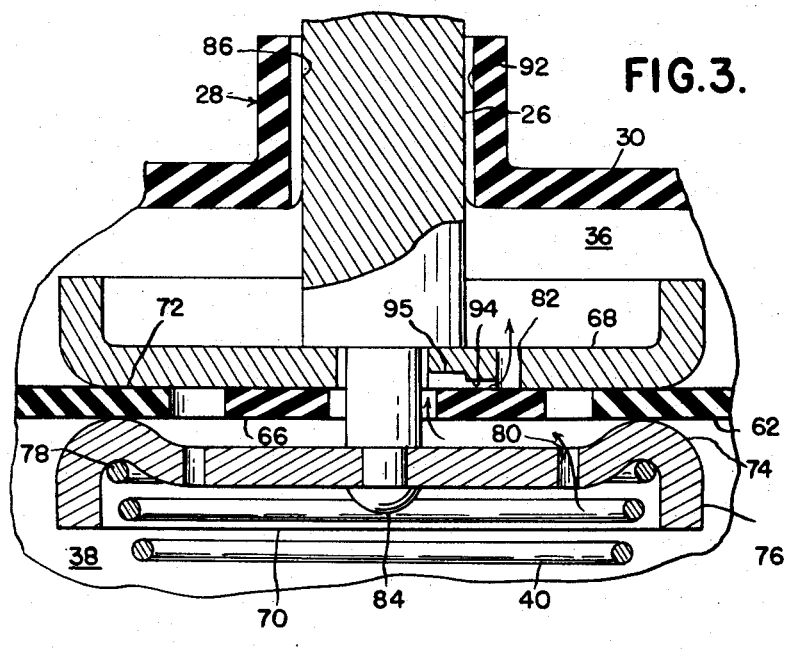
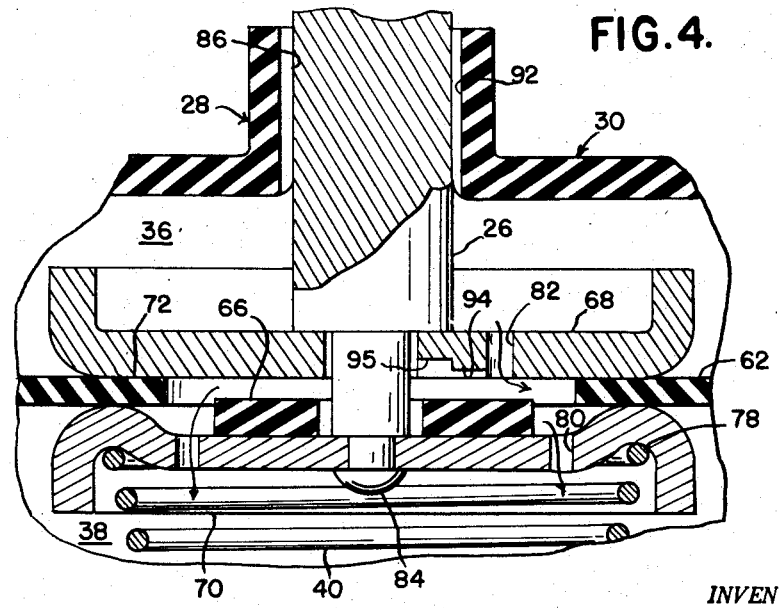
INVENTOR.
BOB G. LIFT
BY Whittemore
Hulbert & Belknap
ATTORNEYS

United States Patent Office 3,081,846
Patented Mar. 19, 1963

3,081,846
DASHPOT ASSEMBLY
Bob G. Lift, Royal Oak, Mich., assignor to Holley Carburetor Company, Warren, Mich., a corporation of Michigan
Filed Nov. 7, 1960, Ser. No. 67,702
5 Claims. (Cl. 188—94)

The invention relates to diaphragm clamping structure including a two part housing, one part of which is constructed of a plastic and a diaphragm secured around its outer periphery between the parts of the housing and refers more specifically to a dashpot construction including the diaphragm clamping structure and actuated by a rod extending through the plastic housing part.

In the past the clamping of diaphragms between housing parts therefor by providing metal flanges on the housing parts and spinning one of the flanges over the other with the diaphragm periphery extending between the flanges has been unsatisfactory. Prior constructions have been unsatisfactory due to the fact that too little clamping pressure between the flanges allows the diaphragm to pull loose or leak while with both flanges constructed of metal a slightly greater clamping pressure than necessary to hold the diaphragm between the flanges may cut the diaphragm or cause the diaphragm to extrude from between the flanges whereby the diaphragm also leaks. Further the exact clamping pressure necessary to satisfactorily hold diaphragms between metal flanges without damaging them is difficult to compute and has in the past been determined through trial and error. The trial and error procedure is wasteful of both time and material.

In addition the surface condition of the sealing flanges has been found to be of major importance in securing the diaphragms between the flanges. Thus by conditioning the surface of the sealing flanges to increase the friction loading on the diaphragm material the assembly pressure may be reduced with consequent reduction in the possibility of cutting the diaphragm material without reducing the holding power of the flanges on the diaphragm. The use of a flange formed of a plastic for one of the sealing flanges permits the desired surface condition to be obtained during molding of the flange without the necessity of performing a separate step as has been found necessary when stamped metal flanges are used.

Furthermore, the usual housing members which are stamped from metal may have sharp edges which can damage a diaphragm in assembly. Also the stamped housing members have flanges which are often deformed sufficiently to permit leakage around the edges of the diaphragm even though correct sealing pressure is used in spinning the flanges.

Furthermore, where metal housing members have been used in dashpot constructions excessive wear and undesirable noises have resulted from contact of other metal elements of the dashpot assembly such as the actuating rod thereof with the metal housing members.

Also, with prior dashpot constructions wherein dashpot action is effected by means of a diaphragm assembly including a loose diaphragm operable in conjunction with a staked restriction in a diaphragm washer to restrict flow through the diaphragm assembly on movement of the diaphragm assembly in one direction, the rate of the dashpot has varied objectionably in operation in accordance with the radial position of the loose diaphragm due to the length of the orifice formed between the staked portion of the washer and the loose diaphragm changing with the radial position of the loose diaphragm.

It is therefore one of the objects of the present invention to provide a pair of clamping members including a pair of flanges and a diaphragm clamped therebetween, one of which flanges is made of a plastic.

Another object is to provide a dashpot construction including a two part housing, each of said parts including a flange and a diaphragm clamped therebetween, one part of said housing being made of a plastic.

Another object is to provide a two part housing, one part having a flange made of a plastic, the other part having a flange of formable metal, and a diaphragm clamped between the flanges with the metal flange spun over the plastic flange.

Another object is to provide a dashpot assembly comprising a housing having two parts, one of which is constructed of a plastic, a diaphragm, the outer periphery of which is clamped between the two parts of the housing, a pair of washers having the inner periphery of the diaphragm clamped therebetween, a second annular diaphragm loosely held between the washers, one of said washers having openings therethrough radially outwardly thereof with respect to the second diaphragm, the other of the washers having an opening therethrough radially inwardly thereof with respect to the second diaphragm and a staked groove between the radially inner periphery of the second washer and the opening therethrough, a rod secured to the washers and extending through the plastic part of the housing and spring means urging the washers, diaphragms and rod toward said plastic part of the housing.

Another object is to provide a dashpot assembly as set forth above wherein the staked groove is enlarged radially inwardly of the radially outwardmost possible position of the inner periphery of the loose diaphragm at the staked groove so that the controlling restriction is always within the area of the loose diaphragm to provide a constant dashpot rate during operation.

Another object is to provide a diaphragm assembly and dashpot as set forth above which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 3 is an enlarged partial section of the dashpot shown in FIGURE 1 taken on the line 2—2 in FIGURE 1 and illustrating the position of the loose diaphragm therein during movement of the actuating rod in the downward direction as shown in FIGURE 2.

FIGURE 4 is an enlarged partial section of the dashpot shown in FIGURE 1 taken on the line 2—2 in FIGURE 1 and illustrating the position of the loose diaphragm therein during movement of the actuating rod in the upward direction as shown in FIGURE 2.

Figure 1:
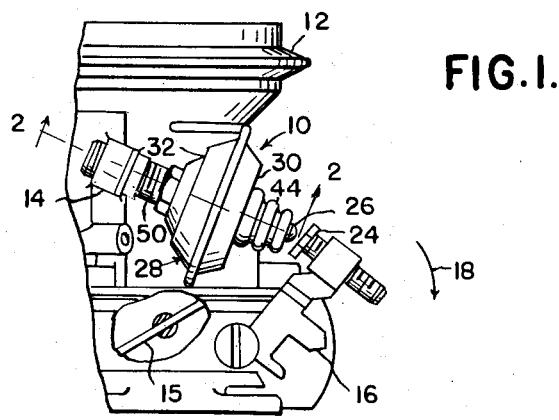
FIGURE 1 is an elevational view of a dashpot constructed in accordance with the invention is assembly with a carburetor.

With particular reference to the drawing a specific embodiment of the diaphragm clamping structure and dashpot construction of the present invention will now be disclosed.

As shown in FIGURE 1 a dashpot 10 is secured to carburetor 12 by means of bracket 14. The dashpot 10 serves to retard the closing of the throttle valve 15 of the carburetor 12 on engagement with the throttle linkage 16 to prevent stalling of an engine associated with the carburetor 12 due to rapid feeding of fuel thereto and sudden closing of the throttle valve thereof.

More specifically the carburetor 12 includes the throttle linkage 16 operable on rotation of the throttle 15 in a throttle opening direction to move in the direction of arrow 18 in FIGURE 1. The throttle 15 is spring loaded in the usual manner to return to a closed position. The adjustable abutment 24 on linkage 16 is positioned to contact dashpot rod 26 on counterclockwise movement of the linkage 16 as the throttle valve approaches a closed position whereby the closing of the throttle valve 15 of the carburetor 12 will be retarded due to the action of the dashpot 10.

Figure 2:
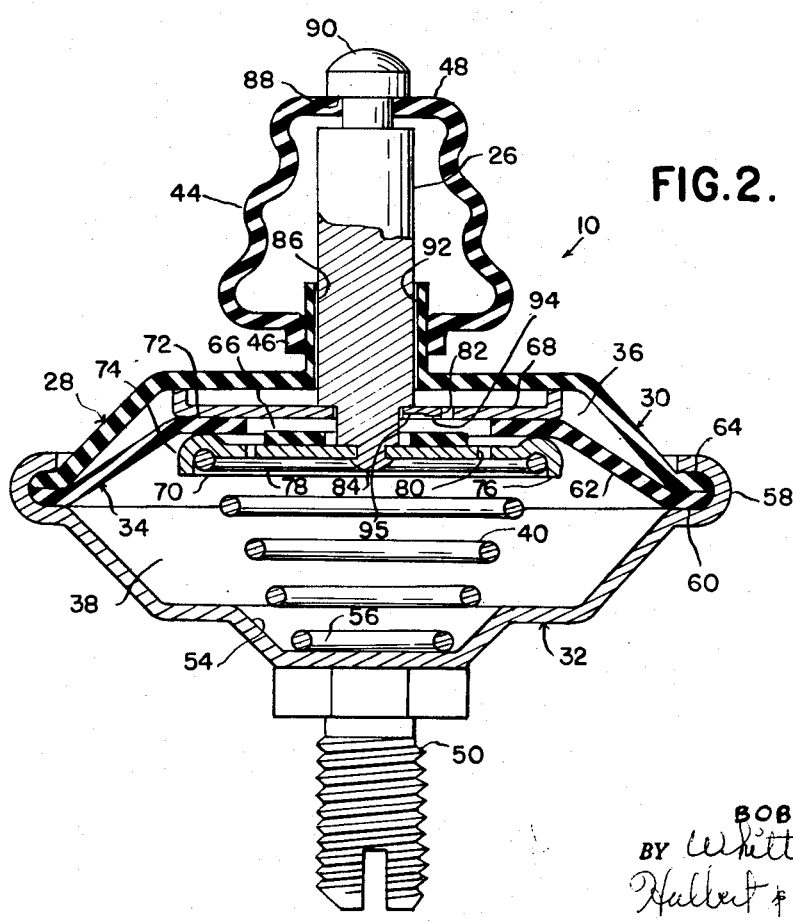
FIGURE 2 is a longitudinal section of the dashpot shown in FIGURE 1 taken on the line 2—2 in FIGURE 1.

The dashpot 10, as shown best in FIGURE 2, includes a housing 28 having an upper part 30 made of a plastic and a lower metal part 32. Diaphragm assembly 34 is clamped between the upper and lower parts of the housing 28 to form chambers 36 and 38. The dashpot 10 further includes spring 40 urging the diaphragm assembly 34 in an upward direction, as shown in FIGURE 2, and previously indicated rod 26 secured to the diaphragm assembly 34 and extending through the housing part 30 and flexible boot 44. Boot 44 is slidably mounted at end 46 on the plastic housing part 30 and at the other end 48 is secured to the rod 42. Boot 44 while it is not provided with air tight connections serves to prevent foreign material from entering the housing part 30.

The part 32 of the housing 28 comprises a generally circular stamping formed as shown in FIGURE 2. The part 32 has secured thereto by convenient means, such as welding or the like, the threaded stud 50 for securing the dashpot 10 to the bracket 14. The part 32 of the housing 28 also includes a recess 54 adapted to receive the end 56 of the spring 40 and the annular flange 58 adapted to be spun over the radially outer periphery 60 of the radially outer diaphragm 62 and the flange 64 of the part 30 of the housing 28 to secure the diaphragm in assembly with the housing.

The diaphragm assembly 34 includes the diaphragm 62 having the radially outer periphery 60 thereof secured between the flanges 58 and 64 of the parts 30 and 32 of the housing 28 and the radially inner annular diaphragm 66 sleeved over the end of rod 26 as shown best in FIGURES 2-4. Diaphragm assembly 34 further includes the washers 68 and 70 which clamp the radially inner periphery 72 of the radially outer diaphragm 62 therebetween. Washer 70 is provided with a ridge 74 and flange 76 around the outer periphery thereof to provide a seat for the end 78 of the spring 40 and to space the washer 70 from the radially outer diaphragm 62 to permit movement of the radially inner diaphragm 66 axially of the rod 26. Washer 70 is further provided with openings 80 therethrough which are radially outwardly positioned in the washer 70 with respect to the possible radially outer position of the inner diaphragm 66. The washer 68 is provided with the opening 82 therethrough positioned radially inwardly with respect to the outer diameter of diaphragm 66 and further includes the staked groove 94 between the inner periphery thereof and the opening 82 to provide an orifice between the washer 68 and the loosely mounted diaphragm 66 through which air flows during operation of the dashpot. The radially inner portion 95 of the groove 94 is enlarged as shown best in FIGURES 3 and 4 to provide a constant length orifice 94 in conjunction with the diaphragm 66 in all radial positions thereof whereby a constant dashpot rate may be maintained.

As previously indicated the washers 68 and 70 are secured to the end 84 of the rod 26 which extends through an opening 86 in part 30 of the housing 28. Rod 26 is reciprocal within the opening 86 and is retarded in its movement in a downward direction, as shown in FIGURE 2, but is capable of moving quickly in an upward direction as shown in FIGURE 2 as will later be considered. The rod 26 is provided with an annular recess 88 about the end 90 thereof for securing the boot 44 thereto.

The part 30 of the dashpot housing 28, as shown best in FIGURE 2, is constructed of a suitable plastic such as Delrin, which has self-lubricating properties. The Delrin material has low friction properties and is highly resistant to abrasion and deterioration by hydrocarbons. The strength of the material varies over a wide temperature range between 7,500 and 14,700 p.s.i. in tension and between 5,200 and 18,000 p.s.i. in compression with different amounts of deformation. Rockwell hardness of the material is typically in the range M94, R120. Materials other than the specific example Delrin having similar properties may of course also be used for part 30 of housing 28 within the scope of the invention.

The term "plastic" as used herein is intended to define the mtaerials included within the definition set forth in 1955 "Modern Plastics Encyclopedia," as follows:

"PLASTIC (*a*)—Capable of being molded; made of any type of *Plastics*.

(n.)—A plastic is any one of a large and varied group of materials which consists of, or contains as an essential ingredient, an organic substance of large molecular weight; and which while solid in the finished state, at some stage in its manufacture has been or can be formed (cast, calendered, extruded, molded, etc.) into shape by flow—usually through the application singly or together of heat and pressure."

Due to the provision of a plastic housing part 30 noises developed by the dashpot due to the movement of a metal rod 26 in a metal housing part has been eliminated. In addition the requirement for lubrication between the rod 26 and the housing part 30 is eliminated or at least greatly reduced and the wear therebetween is minimized.

The housing part 30 includes the flange 64 as previously indicated. Since the flange 64 is also constructed of a plastic, sharp edges thereon which would tend to cut the diaphragm 60 are eliminated. In addition should the flanges 58 or 64 not be perfectly flat which is often the case with stamped housing parts, a plastic flange 64 is easily deformed to agree with the contour of the flange 58 of the housing part 32 during spinning of the flange 58. Such conforming of a plastic flange 64 does not require pressure sufficient to cut the diaphragm 60 as is often the case when clamping a diaphargm between two housing parts.

Also since the part 30 of the housing 28 is molded rather than stamped, the air escape grooves 92 in passage 86 may be molded therein, thereby reducing the manufacturing steps required in the dashpot construction since the grooves 92 need not be machined in the rod 26. The manufacturing steps required in the dashpot construction are further reduced through the use of a plastic housing part 30 since the desired surface condition to provide maximum frictional resistance between the flange 64 and the diaphragm 60 may be molded during forming of the housing part 30 rather than being formed by a separate operation as is necessary with stamped metal housing parts.

Thus the provision of a plastic housing part 30 provides quieter performance and longer life for the dashpot due to the self-lubricating properties thereof, permits manufacture of the dashpot with fewer steps since grooves, such as 92, and desired flange surface conditions may be molded into the housing part 30, and aids in the assembly of the finished dashpot since the flange 64 of a plastic housing part 30 may be easily deformed when clamping the diaphragm periphery between the flanges 58 and 64 without danger of cutting the diaphragm 62 or otherwise causing leaks therein.

In operation, with the throttle linkage 16 rotated clockwise so that the abutment 24 is out of engagement with the end 90 of rod 26 as shown in FIGURE 1, the components of the dashpot are positioned as shown in FIGURE 2. The linkage 16 is then subsequently moved in a counterclockwise direction so that the abutment 24 contacts the end 90 of the rod 26 as the throttle approaches an idle position. The rod 26 is thereafter forced downward by abutment 24 in opposition to spring 40.

As the rod 26 moves downward, as shown in FIGURE 2, the air in chamber 38 thereof attempts to pass through the diaphragm assembly 34 into chamber 36. As the air in chamber 38 passes through the openings 80 in the washer 70 the inner diaphragm 66 is moved upward against the surface of the washer 68 and is held in this position due to air pressure thereon, as shown in FIGURE 3. The staked groove 94 is provided in the washer 68 to permit bleeding of the air trapped in chamber 38 through the staked groove 94 and opening 82 into chamber 36.

The portion 95 of groove 94 extending from the radially inner periphery of the washer 68 to the radially outermost possible position of the inner periphery of the diaphragm 66 at the groove is enlarged as shown best in FIGURES 2, 3 and 4. A constant orifice length of controlling dimension for bleeding of air from chamber 38 regardless of the position of the diaphragm 66 is thus provided as will be seen from inspection of the figures. A constant dashpot rate is thus provided in operation.

Thus, the movement of the rod 26 in a downward direction, as shown in FIGURE 2, is retarded due to spring 40 and also due to the restricted passage of air through the diaphragm assembly 34. Linkage 16 is therefore caused to continue its counterclockwise rotation at a much slower rate than before contact of abutment 24 with the end 90 of rod 26 of the dashpot 10. Thus the throttle valve is closed slowly on approaching an idle position to prevent stalling of an engine associated with the carburetor.

When the throttle valve is again opened and the linkage 16 is rotated in a clockwise direction the elements of the diaphragm assembly 34 assume the position shown in FIGURE 4, at which time the diaphragm assembly 34 and the rod 26 connected thereto are forced toward the part 30 of the housing 28 by means of spring 40. As the diaphragm assembly 34 is moved upward, as shown in FIGURE 2, the air in chamber 36 is permitted to pass freely through opening 82 in the washer 68 and opening 80 in washer 70 since the air passing in this direction through the diaphragm assembly 34 holds the inner diaphragm 66 against the surface of the washer 70 thereby opening passage 82. Also, during movement of the diaphragm assembly 34 air may pass into and out of chamber 36 through grooves 92 provided in housing part 30.

While the two part metal and plastic housing of the invention wherein a diaphragm is clamped against a flange of plastic by a metal flange spun over the diaphragm and plastic flange has been disclosed in conjunction with a novel dashpot construction, it is not intended to limit the diaphragm clamping structure to any single construction as widely varied applications thereof are contemplated. In addition many modifications of the dashpot construction disclosed will suggest themselves to those skilled in the art. It is intended to include all such modifications as are suggested by the disclosed subject matter within the scope of the invention.

The drawings and the foregoing specification constitute a description of the improved diaphragm clamping structure and dashpot assembly in such full, clear, concise and exact terms as to enable any person skilled in the art to practice the invention, the scope of which is indicated by the appended claims.

What I claim as my invention is:
1. A dashpot comprising a housing including two separate parts one of which has an opening therethrough, an outer annular diaphragm the outer circumferential edge of which is clamped between said two housing parts, a pair of washer members maintained in axial spaced relation and clamping the inner periphery of said outer diaphragm therebetween, a rod secured to the washers centrally thereof and extending between said washers and through said opening in said one housing part, resilient means acting between one of said washers and the other housing part for biasing the rod out of the housing, an inner annular diaphragm sleeved over said rod and located between said washers, said inner annular diaphragm having an outer diameter smaller than the inner diameter of the outer diaphragm and an inner diameter larger than the diameter of the portion of the rod extending between the washers, one of said washers having openings therethrough radially outwardly of the inner diaphragm and radially inwardly of the outer diaphragm, the other of said washers having an opening therethrough radially inwardly of the outer periphery of the inner diaphragm and radially outwardly of the inner periphery of the inner diaphragm, and a radial groove in the surface of the other washer adjacent said inner diaphragm extending between the rod and opening through said other washer for providing a restricted orifice between the inner diaphragm and other washer to permit restricted passage of a medium in the dashpot through the diaphragm assembly on movement of the rod into the housing.

2. Structure as claimed in claim 1 wherein the radially inner end of the groove in said other washer is enlarged for a distance such that said distance and the diameter of the rod between the washers is greater than the inner diameter of the inner diaphragm whereby the restricted portion of the orifice between the inner diaphragm and said other washer is of constant length regardless of limited radial movement permitted by the inner diaphragm.

3. Structure as set forth in claim 2 wherein said one of the housing parts is plastic and is provided with a radially outer annular flange and the other housing part is deformable and is provided with a radially outer annular flange which is spun over the radially outer annular flange of said one housing part to clamp the outer periphery of the outer diaphragm to the radially outer annular flange of the one housing member.

4. Structure as claimed in claim 3 wherein a sleeve is provided around said opening in said one part of said dashpot housing and radially inner axially extending grooves are provided therein to permit bleeding of a dashpot operating medium into and out of the dashpot.

5. A dashpot comprising a housing having an opening therethrough, an outer annular diaphragm within said housing the outer periphery of which is secured to said housing, a pair of members within the housing maintained in axial spaced relation, means securing the inner periphery of said outer diaphragm between said pair of members, a rod secured to the members centrally thereof and extending between said members and through said opening in said housing, resilient means acting between one of said members and the housing for biasing the rod out of the housing, an inner annular diaphragm sleeved over said rod and located between said members, said inner annular diaphragm having an outer diameter smaller than the inner diameter of the outer diaphragm and an inner diameter larger than the diameter of the portion of the rod extending between the members, one of said members having openings therethrough radially outwardly of the inner diaphragm and radially inwardly of the outer diaphragm, the other of said members having an opening therethrough radially inwardly of the outer periphery of the inner diaphragm and radially outwardly of the inner periphery of the inner diaphragm, and a radial groove in the surface of the other member adjacent said inner diaphragm extending between the rod and opening through said other member for providing a restricted orifice between the inner diaphragm and other member to permit restricted passage of a medium in the dashpot through the diaphragm assembly on movement of the rod into the housing.

References Cited in the file of this patent

UNITED STATES PATENTS

| | | |
|---|---|---|
| 2,190,842 | Kuhn | Feb. 20, 1940 |
| 2,657,037 | Braun | Oct. 27, 1953 |
| 2,675,204 | Johnson | Apr. 13, 1954 |
| 2,692,651 | Ball | Oct. 26, 1954 |
| 2,782,025 | Olson | Feb. 19, 1957 |
| 2,785,347 | Tremblay | Mar. 12, 1957 |
| 2,866,862 | Bachi | Dec. 30, 1958 |
| 2,894,740 | Emerson et al. | July 14, 1959 |
| 2,947,509 | Smitley et al. | Aug. 2, 1960 |
| 2,969,973 | Scholz | Jan. 31, 1961 |